US006108506A

United States Patent [19]

Umetani

[11] Patent Number: 6,108,506

[45] Date of Patent: *Aug. 22, 2000

[54] DEVELOPER AND MAGNETIC IMAGE FORMATION APPARATUS USING THE SAME

[75] Inventor: Yoshinobu Umetani, Yamatotakada, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/114,927

[22] Filed: Jul. 14, 1998

[30] Foreign Application Priority Data

Jul. 14, 1997 [JP] Japan .................................... 9-188792

[51] Int. Cl.[7] .......................... G03G 15/10; G03G 9/083; G03G 9/00; G11B 9/00

[52] U.S. Cl. ..................... 399/237; 346/74.2; 430/106.6; 430/112; 430/114

[58] Field of Search .................................... 399/267, 237; 346/74.2; 430/122, 112, 109, 114, 110, 106.6; 347/100; 355/27

[56] References Cited

U.S. PATENT DOCUMENTS

| | | | |
|---|---|---|---|
| 3,345,294 | 10/1967 | Cooper | 430/122 |
| 3,865,611 | 2/1975 | Sato et al. | 399/237 X |
| 4,459,598 | 7/1984 | Ohta | 346/74.2 |
| 4,877,341 | 10/1989 | Cherbuy et al. | 346/74.2 |
| 5,175,582 | 12/1992 | Kondo | 355/27 |
| 5,456,990 | 10/1995 | Takagi et al. | 430/110 X |
| 5,489,967 | 2/1996 | Sakagami et al. | 346/74.2 X |
| 5,620,824 | 4/1997 | Okado et al. | 430/110 X |
| 5,721,084 | 2/1998 | Ono et al. | 430/110 |
| 5,750,594 | 5/1998 | Page et al. | 347/100 X |
| 5,771,426 | 6/1998 | Oka et al. | 399/267 X |

FOREIGN PATENT DOCUMENTS

| | | |
|---|---|---|
| 63-33753 | 2/1988 | Japan . |
| 2-157766 | 6/1990 | Japan . |
| 5-188827 | 7/1993 | Japan . |
| 5-241451 | 9/1993 | Japan . |
| 63-300275 | 12/1998 | Japan . |

*Primary Examiner*—Susan S. Y. Lee

[57] ABSTRACT

A magnetic image forming apparatus includes a developer for developing a magnetic latent image. The developer has a liquid ink and particles of a resin to be dispersed in the liquid ink. The particles contain magnetic powder formed of plural parts dispersed in each of the particles of the resin. The apparatus also includes a stirrer for stirring the developer in a storage device. Also, there is a restrictor for limiting an amount of developer to be supplied.

12 Claims, 4 Drawing Sheets

DEVELOPER AND MAGNETIC IMAGE FORMATION APPARATUS USING THE SAME

CROSS-REFERENCE TO RELATED APPLICATIONS

This application is related to Japanese application No. Hei 9(1997)-188792, filed on Jul. 14, 1997 whose priority is claimed under 35 USC §119, the disclosure of which is incorporated by reference in its entirety.

BACKGROUND OF THE INVENTION

1. Field of the Invention

The present invention relates to a developer for developing a magnetic latent image and a magnetic image formation apparatus using the same.

2. Related Arts

FIG. 4 is a view showing a conventional wet magnetic image formation apparatus 80. The image formation apparatus 80 comprises a magnetic drum 81, a magnetic head 82, a developing device 83 and a transfer roller 84. The magnetic drum 81 has a cylindrical shape and is provided with the magnetic head 82, the developing device 83 and the transfer roller 84 in this order along a direction of rotation 89 on an outer periphery of the magnetic drum 81. Operation of the magnetic drum 81 is synchronized with operations of the magnetic head 82, the developing device 83 and the transfer roller 84. In accordance with rotation of the magnetic drum 81, a magnetic image is formed as mentioned below. Image data from an information instrument (not shown) are sent to the magnetic head 82 and recorded on the magnetic drum 81 as a magnetic latent image by the magnetic head 82.

The developing device 83 stores a developer 94. The developer 94 is composed of a magnetic powder of a ferromagnetic pigment and a liquid ink consisting of a solvent and a coloring pigment or a dye. Specific gravity of the magnetic powder is larger than that of the liquid ink, so that the magnetic powder cannot be kept dispersed uniformly in the liquid ink for a long time by itself. In order to disperse the magnetic powder uniformly in the liquid ink to form the developer 94 having uniform magnetic characteristics, a surface active agent, a resin or the like is added to the liquid ink.

FIG. 5 is a view showing a state of a magnetic powder 91 when a surface active agent 92 is added thereto. When the surface active agent 92 is added, the surface active agent 92 binds to the periphery of the magnetic powder 91. FIG. 6 is a view showing a state of the developer 94 when the surface active agent 92 is added. By using the surface active agent 92, the magnetic powder 91 can disperse uniformly in a liquid ink 93.

Referring to FIG. 4 again, by means of a developing roller 88 provided in the developing device 83, the developer 94 is supplied to a peripheral surface of the magnetic drum 81, whereby the magnetic latent image is developed. By the transfer roller 84, the latent image formed by the developer 94 on the magnetic drum 81 is transferred to a recording paper 87. Finally, the magnetic latent image on the magnetic drum 81 is erased and the developer 94 remaining on the magnetic drum 81 is removed. By repeating these, images are formed successively. Such a conventional wet magnetic image formation apparatus is disclosed for example, in Japanese Unexamined Patent Publication No. Hei 5(1993)-188827.

As for a magnetic image formation apparatus, there are dry magnetic image formation apparatuses 40 and 50 besides the wet magnetic image formation apparatus 80. FIG. 7 is a view showing the dry magnetic image formation apparatus 40. Though a process for forming an image for the dry magnetic image formation apparatus 40 is the same as the one for the above-mentioned wet magnetic image formation apparatus 80, methods for developing and transferring an image for the dry magnetic image formation apparatus 40 are different from the ones for the wet magnetic image formation apparatus 80. A dry toner to be used for the dry magnetic image formation apparatus 40 is pretreated to have a sensitivity to both magnetic force and electrostatic force. Accordingly, the toner adheres to the magnetic latent image formed on the magnetic drum 41 in correspondence with the magnetic force of the magnetic latent image and therefore, an image is developed. Moreover, by the transfer roller 43 facing the magnetic drum 41 across a recording paper 44, an electrostatic force larger than the above-mentioned magnetic force is applied to the toner on the magnetic drum 41. Accordingly, the toner is attracted towards the transfer roller 43 and is transferred to a surface of the recording paper 44. Then, heat pressing by a fixing roller 45 is applied to the toner image transferred on the recording paper 44 to fix it. In addition, Japanese Unexamined Patent Publication No. Sho 63(1988)-300275 discloses a wet magnetic image formation apparatus for forming an image by the same image formation process as the one for the dry magnetic image formation apparatus 40, wherein a liquid toner has a sensitivity to both magnetic force and electrostatic force.

FIG. 8 is a view showing another dry magnetic image formation apparatus 50. Process in the dry magnetic image formation apparatus 50 and the dry magnetic image formation apparatus 40 are the same until the developing step is performed. As for the dry magnetic image formation apparatus 50, by applying pressure to a magnetic drum 51 by a transfer roller 53, a toner image on the magnetic drum 51 is transferred to a recording paper 55 and fixed at the same time and further, securely fixed by a pressing device 56.

The two representative dry magnetic image formation apparatuses 40 and 50 mentioned above have problems as follows. In the former case, it is difficult to allow each toner particle of the toner to have the same electromagnetic characteristics, the toner having a sensitivity to both magnetic force and electrostatic force. Therefore, it is impossible to perform a stable image formation at all times. This situation remains the same in the case of the wet magnetic image formation apparatus disclosed in Japanese Unexamined Patent Publication No. Sho 63(1988)-300275. In the latter case, since transferring and fixing are performed at the same time by applying a high pressure of about 10 kg to contact-bond a toner image on a recording paper 55, a pressing mechanism 57 in the apparatus containing the transfer roller 53 and the pressing device 56 is complicated and therefore, an apparatus itself becomes expensive. Moreover, by applying a high pressure on the toner, the toner image transferred to the recording paper 55 becomes glossy and unattractive, and moreover, the recording paper 55 is apt to be wrinkled. Further, if the recording paper 55 has a low smoothness, fixation of the toner is so weak that the toner is apt to come off.

In the wet magnetic image formation apparatus 80, transferring is performed by contacting an ink image formed on the magnetic drum 81 with a recording paper 87 with low pressure. Accordingly, the problems which the dry magnetic image formation apparatuses 40 and 50 have can be solved by using the wet magnetic image formation apparatus 80. However, in the wet magnetic image formation apparatus 80, when the liquid ink 93 is transferred to the recording paper 87, not only the liquid ink 93 but also the magnetic powder 91 is transferred to the recording paper 87 because of a strong binding force of the surface active agent 92. As mentioned above, since the magnetic powder 91 is a pigment, the image formed on the recording paper 87 becomes a peculiarly colored and blurred image, so that full reproducibility of colors cannot be achieved.

SUMMARY OF THE INVENTION

The purpose of the present invention is to provide a developer being capable of forming an image with good reproducibility of colors without transferring the magnetic powder to the recording paper and a magnetic image formation apparatus using the same.

Thus, the present invention provides a developer for developing a magnetic latent image, comprising a liquid ink and particles of a resin to be dispersed in the liquid ink, the particles containing a magnetic powder dispersed in the resin.

Further, the present invention provides a magnetic image formation apparatus comprising: a magnetic latent image carrier; a magnetic latent image formation means for forming a magnetic latent image on the magnetic latent image carrier; a developer storage means for storing the developer; a developer supplying means for supplying the magnetic latent image carrier having the magnetic latent image formed thereon with the developer stored by the developer storage means so as to develop the magnetic latent image; a transferring means for transferring the developed image to a predetermined recording member; a demagnetizing means for demagnetizing the magnetic latent image carrier; and a removing means for removing the developer on the magnetic latent image carrier.

DETAILED DESCRIPTION OF THE PREFERRED EMBODIMENTS

Figure 1:
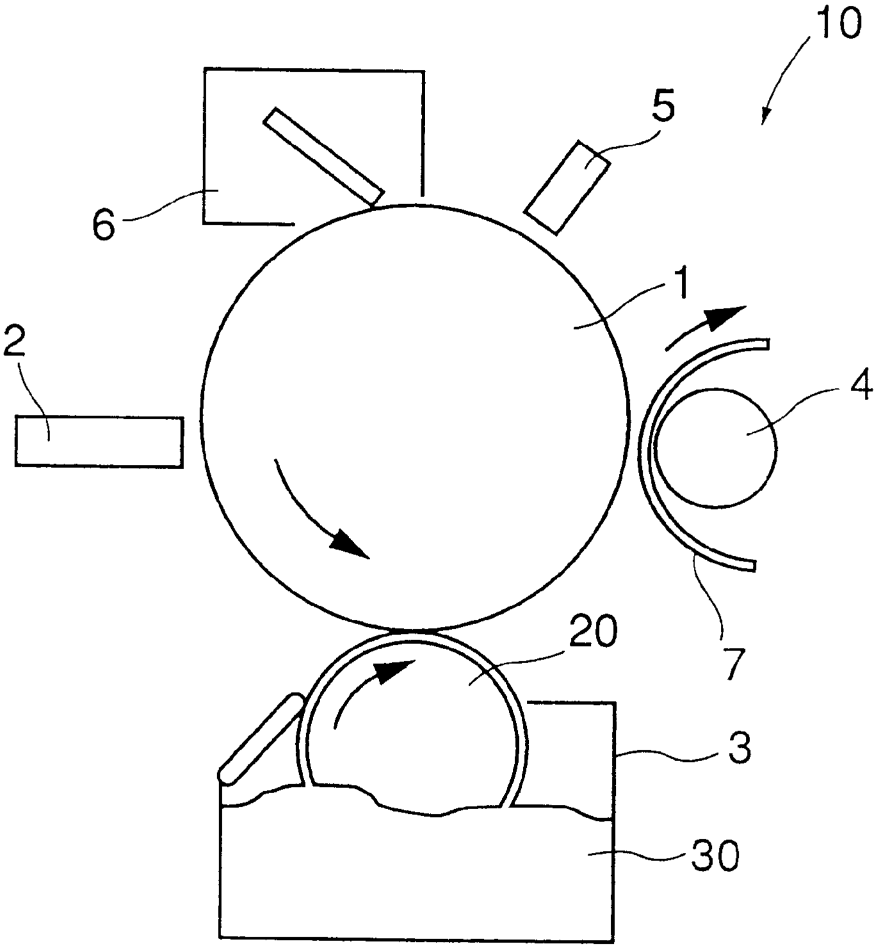
FIG. 1 is a view showing a wet magnetic image formation apparatus 10 of an embodiment of the present invention.

The present invention provides a developer for developing a magnetic latent image, comprising a liquid ink and particles of resin to be dispersed in the liquid ink, the particles containing a magnetic powder dispersed in the resin.

According to the present invention, by making the magnetic powder contained in the resin, the magnetic powder is brought into contact with the ink through the resin. Compared with a binding force between the magnetic powder and the ink in the case where the surface active agent intervenes between them, a binding force in the case where the resin intervenes between them as mentioned above is smaller. Accordingly, when the developer is used for an image formation apparatus, the particles carry the ink around due to a wettability of the resin, thereby to develop the magnetic latent image. However, since the wettability thereof cannot afford a large binding force between the particles and the ink, the ink is absorbed by the recording member for transferring the ink, so that the particles and the ink can be separated from each other easily when the ink contacts the recording member. Accordingly, only the ink is transferred to the recording member, so that a transferring process with good reproducibility of colors can be realized.

Further, the present invention is characterized in that the specific gravity of the ink is larger than that of the particles.

According to the present invention, the ink is selected so that the specific gravity of the ink is larger than that of the particles. As for the magnetic powder, the specific gravity of the magnetic powder itself is larger than that of the ink, and therefore, dispersing quality of the magnetic powder in the ink is poor. To solve this problem, a treatment, for example adding a surface active agent, is conventionally conducted to improve the dispersing quality of the magnetic powder in the ink. However, the particles containing the magnetic powder disperse fully in the ink without any conventional special treatment by making the magnetic powder contained in the resin and selecting the ink so that the specific gravity of the ink is larger than that of the particles as described in the present invention. Therefore, a developer with uniform magnetic characteristics can be realized.

Further, the present invention is characterized in that the ink is selected so that the viscosity of the ink is in the range of 2 cp to 500 cp.

According to the present invention, the ink is selected in the above-mentioned range because of the following reasons. The amount of the ink adhering to the periphery of the particles of resin depends on the viscosity of the ink. When the viscosity of the ink in the developer to be used for a n image formation apparatus is smaller than 2 cp, the amount of the ink adhering to the particles is small, so that an image transferred to the recording member cannot have a sufficient density. On the other hand, when the viscosity of the ink is larger than 500 cp, the force of the ink binding the particles is larger than the magnetic attracting force generated between the magnetic latent image and the particles, so that the magnetic latent image cannot be developed. By selecting the ink so that the viscosity of the ink is in the range of 2 cp to 500 cp, the magnetic latent image can be developed by the magnetic attracting force and the image having a sufficient density can be formed on the recording member. In this case, the concentration of the ink is adjusted so that the absorption coefficient of the ink is not less than 80%.

Further, according to the present invention, the particles may be selected, so that the diameter of the particles is, for example, in the range of 5 $\mu$m to 50 $\mu$m.

According to the present invention, the particles are selected so that the diameter of the particles is in the above-mentioned range because of the following reasons. The amount of the magnetic powder contained in the particles is determined in proportion to the volume of the particles of resin. Therefore, the smaller the diameter of the particles is, the smaller the magnetic force of the particles is. In the case of using the developer for an image formation apparatus, transferring the image is conducted by allowing only a portion of the ink adhering to the periphery of the particles to be absorbed by the recording member with the particles absorbed on the side of the magnetic latent image. If the diameter of the particles is smaller than the minimum of the given range, the attracting force between the particles and the magnetic latent image is so small that the particles are transferred together with the ink to a piece of paper. Since the magnetic powder contained in the particles is a colored pigment, the particles transferred to the piece of paper cause the color reproducibility of images to deteriorate. On the contrary, as the diameter of the particles becomes larger, the magnetic force of the particles becomes larger because of the above-mentioned reasons, and also the weight of the particles increases, and in accordance therewith, the effect of gravitation applying on the particles increases. If the diameter of the particles is larger than the maximum of the given range, the component of the attracting force in the normal direction of the ground is larger than the gravitation applying on the particles, so that the magnetic latent image cannot be developed. By selecting the particles having the diameter in the given range, the magnetic latent image can be developed and only the ink can be transferred to the recording member with the particles being held on the magnetic latent image. Incidentally, this given range depends on a strength of magnetic force of the latent image and magnetic characteristics of the magnetic powder and is determined, for example between 5 $\mu$m and 50 $\mu$m.

According to another aspect, the present invention provides a magnetic image formation apparatus comprising: a magnetic latent image carrier; a magnetic latent image formation means for forming a magnetic latent image on the magnetic latent image carrier; a developer storage means for storing one of the above-mentioned developers; a developer supplying means for supplying the magnetic latent image carrier having the magnetic latent image formed thereon with the developer stored by the developer storage means so as to develop the magnetic latent image; a transferring means for transferring the developed image to a predetermined recording member; a demagnetizing means for demagnetizing the magnetic latent image carrier; and a removing means for removing the developer on the magnetic latent image carrier.

According to the present invention, the demagnetizing means and the removing means for the developer make an uniformly magnetized state, whereby the magnetic latent image is formed on the cleaned magnetic latent image carrier by the magnetic latent formation means. From the storage means for storing the developer, the developer is supplied to the magnetic latent image by the developer supplying means to develop the magnetic latent image. When the developed image formed by the developer contacts with the recording member by the transferring means, only the ink is transferred to the recording member with the particles being held on the magnetic latent image carrier. Accordingly, the image with a good reproducibility of colors can be realized on the recording member.

Further, the present invention is characterized in that the magnetic image formation apparatus further comprises a stirring means for stirring the developer stored in the developer storage means.

According to the present invention, the developer storage means is provided with the stirring means for stirring the developer and thereby, the particles can disperse uniformly in the ink. Further, by circulating the particles in the ink, a constant amount of the ink can be always supplied to the periphery of the particles. Therefore, the developer can be always supplied to the magnetic latent image carrier in a homogeneous state.

Further, the present invention is characterized in that the magnetic image formation apparatus further comprises a restricting means for restricting an amount of the developer to be supplied by the developer supplying means.

According to the present invention, the amount of the developer to be supplied from the developer supplying means to the magnetic latent image carrier can be restricted by the restricting means and thereby, a constant amount of the developer can be supplied to the magnetic latent image carrier. Accordingly, adjusting the amount of the developer to be supplied by the restricting means can prevent supplying the magnetic latent image carrier with too much developer wastefully. Further, deterioration of images caused by excess amount of the ink, such as an ambiguous outline of ink images transferred to the recording member because of the pressure applied when transferred, can be avoided. Still further, since a necessary and minimum amount of the ink is supplied, the ink transferred to the recording member dries easily and therefore it is not necessary to provide a fixing means. Accordingly, a structure of an image formation apparatus is so simple that a cost for preparing the apparatus can be reduced.

Further, the present invention is characterized in that the demagnetizing means demagnetizes the magnetic latent image carrier after transferring the developed image to the predetermined recording member, and that the removing means removes the developer on the magnetic latent image carrier after demagnetizing the magnetic latent image carrier.

According to the present invention, in the magnetic image formation apparatus, the demagnetizing means demagnetizes the magnetic latent image carrier after the transferring process and moreover, the removing means removes, from the magnetic latent image carrier, the particles and a small amount of the ink remaining on the magnetic latent image carrier after the transferring process. Accordingly, the magnetic latent image carrier returns to the same condition as before the image formation, so that the image formation can be conducted repeatedly.

FIG. 1 is a view showing a wet magnetic image formation apparatus 10 of an embodiment of the present invention. The wet magnetic image formation apparatus 10 comprises a magnetic drum 1, a magnetic head 2, a developing device 3, a transfer roller 4, a demagnetizing device 5 and a cleaning device 6. The magnetic drum 1 has a cylindrical shape and is provided with the magnetic head, the developing device 3, the transfer roller 4, the demagnetizing device 5 and the cleaning device 6 in this order along a direction of rotation on an outer periphery of the magnetic drum 1.

Figure 2:
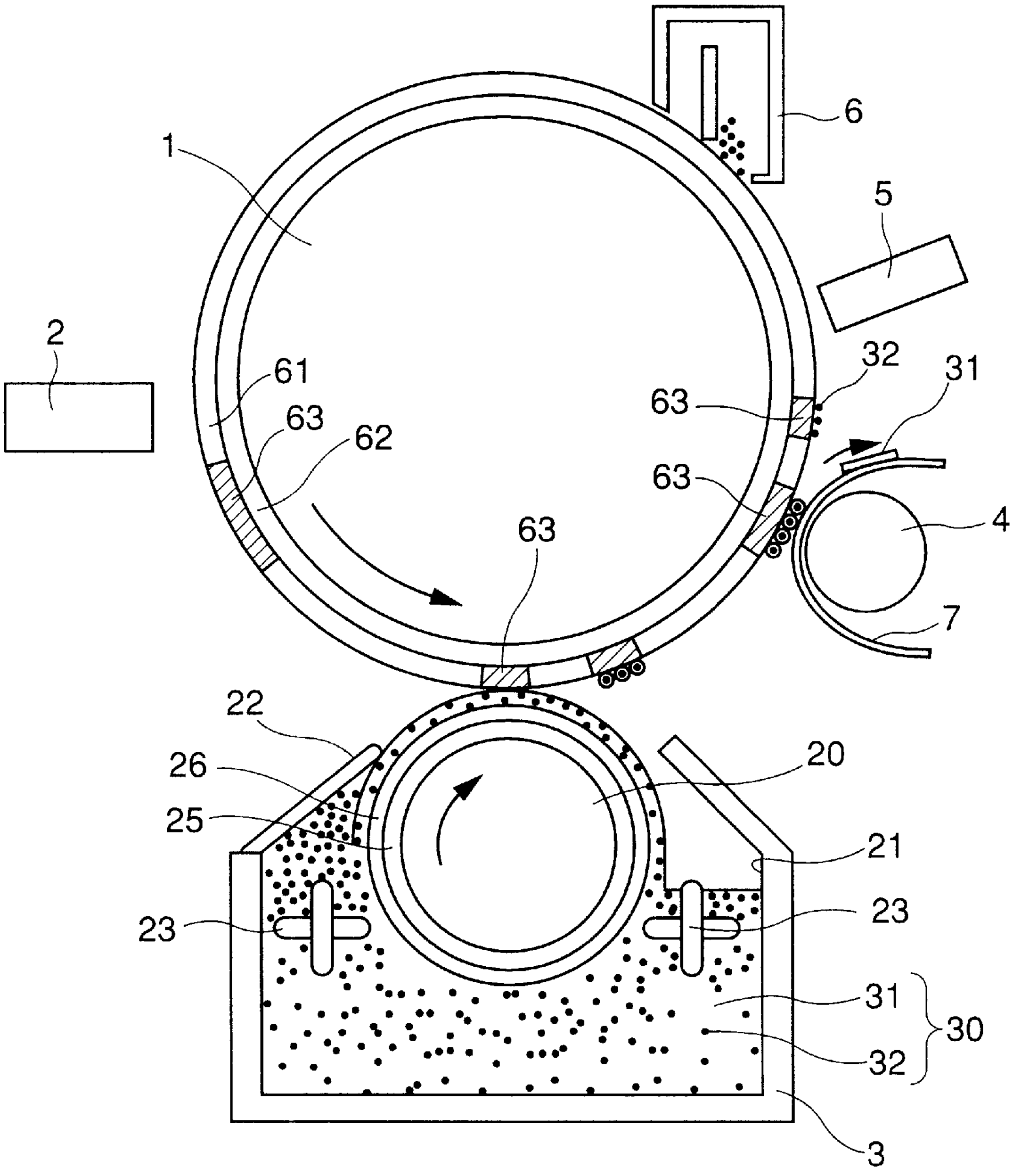
FIG. 2 is a view showing the wet magnetic image formation apparatus 10 in detail.

FIG. 2 is a view showing the wet magnetic image formation apparatus 10 in detail. The magnetic drum 1 is formed of a magnetic layer 61 on a periphery of a drum 62 of aluminum, and the magnetic layer 61 has a magnetic powder dispersed in a binder resin. The magnetic head 2 is connected for example, to an information apparatus (not shown) and receives a digitized image data sent from the information apparatus. The magnetic head 2 forms a magnetic latent image 63 on the magnetic layer 61 by scanning the side of the magnetic drum 1 and emitting magnetic lines of force. In FIG. 2, the magnetic latent image 63 is shown as a shaded portion. The developing device 3 comprises a developing roller 20 and a developer storage tank 21. The developing roller 20 is provided with a solvent-resistant layer 26 on an outer periphery of an drum 25 of aluminum. The developing roller 20 is constructed so that a part of the developing roller 20 is immersed in a developer 30 stored in the developer storage tank 21.

The developer 30 is composed of a liquid ink 31 and resin particles 32. The liquid ink 31 includes a liquid as a solvent and a coloring pigment or a coloring dye having affinity to the solvent. For example, a black liquid ink contains 70% by weight of water as a solvent of the liquid ink, 0.1% by weight of hydrophilic carbon black as a coloring pigment, 10% by weight of a dispersant and 19.9% by weight of the resin and then, a specific gravity thereof is set to 1.100 and a viscosity thereof is set to 15 cp. The resin particles 32 are magnetic materials to be dispersed in the liquid ink 31.

Figure 3:
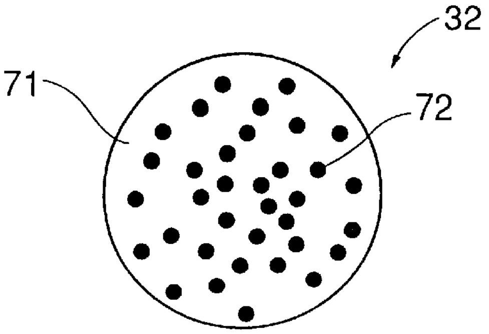
FIG. 3 is a view showing a resin particle 32.
Figure 4:
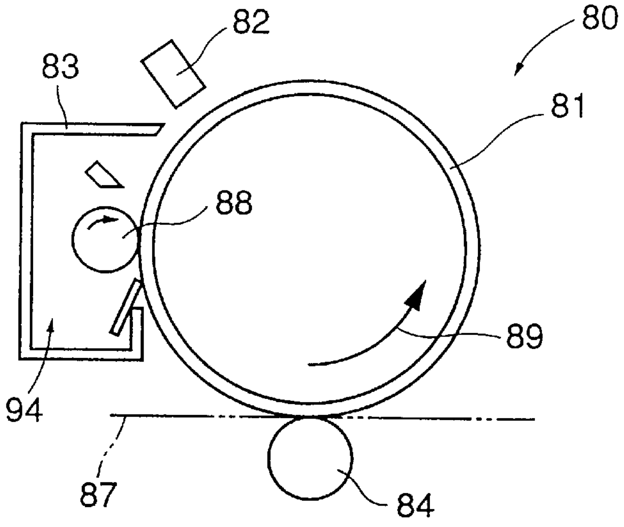
CONVENTIONAL ART FIG.4
FIG. 4 is a view showing a conventional wet magnetic image formation apparatus 80.
Figure 5:
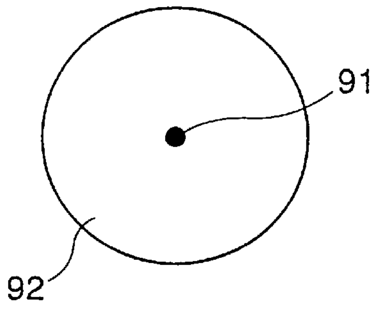
FIG. 5 is a view showing a state of a magnetic powder 91 in the case where a surface active agent 92 is added thereto.
Figure 6:
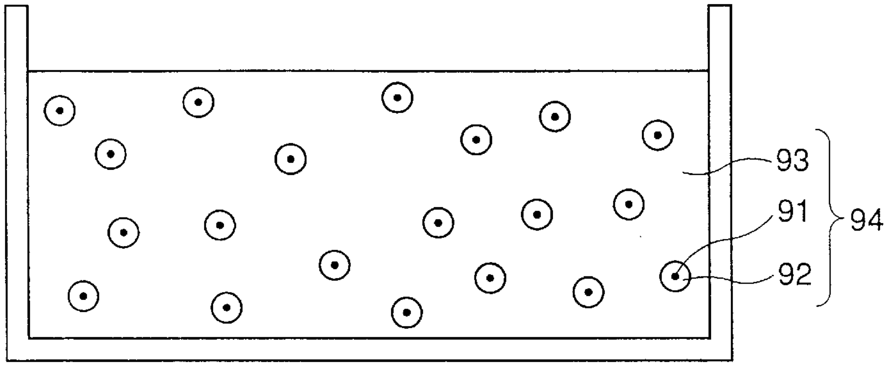
FIG. 6 is a view showing a state of the developer 94 in the case where the surface active agent 92 is added.
Figure 7:
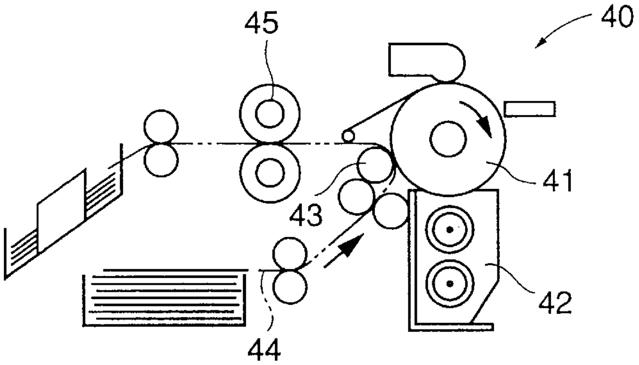
FIG. 7 is a view showing a dry magnetic image formation apparatus 40.
Figure 8:
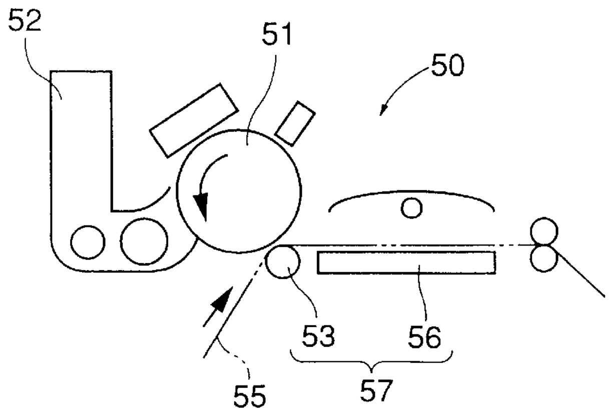
FIG. 8 is a view showing another dry magnetic image formation apparatus 50.

FIG. 3 is a view showing an example of the resin particles 32. The resin particles 32 are prepared by: kneading 98% by weight of a resin 71 and 2% by weight of a magnetic powder 72 having a diameter of not less than 0.5 μm with heating at a temperature of 150 to 200° C., at which the resin 71 is fused, for a few hours to disperse the magnetic powder 72 in the resin 71 uniformly; grinding the resin 71 containing the magnetic powder 72 after the resin 71 is cooled; and classifying the particles into these having a particle diameter of about 8 μm. The resin 71 to be used in the resin particles 32 is selected so as to have an affinity to the solvent of the liquid ink 31. When water is selected as a solvent in the above-mentioned case of the black ink, for example, a styrene-acrylic resin (specific gravity: 0.9) is used. As the magnetic powder 72, a ferromagnetic pigment, for example ferrite (specific gravity: 6.5) is used. In this case, the magnetic powder 72 as a magnetic material has a larger specific gravity than the liquid ink 31. However, if the magnetic powder 72 is dispersed in the resin particle 32, a specific gravity of the resin particles will be 1.012, which is smaller than that of the liquid ink 31. Accordingly, the resin particles 32 may disperse in the liquid ink 31 better than the magnetic powder 72 alone. Here, the styrene-acrylic resin is a styrene-methacrylate copolymer. Representative examples thereof include: styrene-acrylate copolymer, styrene-diethylaminoethyl methacrylate copolymer, styrene-butadiene-acrylate copolymer and styrene-n-butyl methacrylate copolymer.

Referring to FIG. 2 again, the concentration of the resin particles 32 in the liquid ink 31 can be made uniform by keeping on stirring the developer 30 containing the liquid ink 31 and the resin particles 32 at a constant stirring rate by a stirring member 23 provided in the developer storage tank 21. Therefore, the developer 30 containing the liquid ink 31 and the resin particles 32 in a constant mixing ratio can be supplied to the developing roller 20.

A restricting member 22 is installed between a position where the developer 30 in the developer storage tank 21 is caught by the developing roller 20 and a position where the developer 30 is supplied to the magnetic drum 1. The amount of the developer 30 to be supplied to the magnetic latent image 63 depends on a volume of a space formed between the restricting member 22 and the developing roller 20. The developer 30 restricted to a given amount by the restricting member 22 is transferred to the magnetic drum 1 to be supplied to the magnetic latent image 63. Accordingly, the magnetic latent image 63 is developed.

The transfer roller 4, together with the magnetic drum 1, holds a recording paper 7 so as to allow the developer 30 forming the latent image on the magnetic drum 1 to contact with the recording paper 7. Accordingly, the resin particles 32 remain on the magnetic drum 1, so that only the liquid ink 31 is transferred to the recording paper 7. Consequently, the image transferred to the recording paper contains a pure liquid ink 31 and does not contain the magnetic powder 72 of a pigment and therefore, colors of an original picture can be exactly reproduced. Moreover, excess amount of the developer 30 can be removed by providing the restricting member 22, so that a shape of one dot as a pixel may not be lost when the image is transferred to the recording paper 7 by pressure. Further, since the amount of the liquid ink 31 can be restricted to the necessary and minimum amount in order to form one dot by the restricting member 22, an image made of the liquid ink 31 dries fast after being transferred to the recording paper 7. Accordingly, it is not necessary to install a fixing means. Consequently, a clear image without a blur can be obtained and an image formation apparatus having a simple inside structure can be achieved.

The demagnetizing device 5 erases a magnetic latent image 63 formed on the magnetic drum 1. The cleaning device 6 collects the resin particles 32 and a small amount of the liquid ink 31 remaining on the magnetic drum 1 after transferring. By means of the demagnetizing device 5 and the cleaning device 6, the magnetic drum 1 is returned to the original condition with the magnetic layer 61 having the same uniform magnetic state as before forming the image. By repeating the above-mentioned operations, images sent from the information apparatus one after another can be successively developed in a short time. Movements of the magnetic head 2, the developing device 3, the transfer roller 4, the demagnetizing device 5 and the cleaning device 6 installed in the image formation apparatus 10 are all synchronized with the rotating speed of the magnetic drum 1.

In order to achieve the above-mentioned wet magnetic image formation apparatus, the liquid ink 31 and the resin particles 32 are selected so that a viscosity of the liquid ink 31 and a diameter of the resin particles 32 are in the ranges as follows. As for the viscosity of the liquid ink 31, when the viscosity of the liquid ink 31 is less than 2 cp, the ink does not adhere to the resin particles 32 sufficiently, and the density of the image made of the ink transferred to the recording paper 7 is not high enough. On the other hand, when the viscosity of the liquid ink 31 is more than 500 cp, the resin particles 32 are restricted within the liquid ink 31 and therefore, it takes time until the resin particles 32 float to the place where the resin particles 32 can adhere to the developing roller 20. Accordingly, the liquid ink 31 containing a given amount of the resin particles 32 cannot be supplied to the developing roller 20. Even if the liquid ink 31 containing a given amount of the resin particles 32 can be supplied to the developing roller 20, the force of the liquid ink binding the resin particles is larger than the magnetic attracting force generated between the magnetic latent image 63 and the resin particles 32, so that the developer 30 cannot be supplied to the magnetic drum 1. Because of the above-mentioned reasons, the viscosity of the liquid ink 31 is selected in the range of 2 cp to 500 cp.

When the diameter of the resin particles 32 is less than 5 μm, the amount of the magnetic powder 72 contained in the resin particles 32 is so small that the magnetic force of the resin particles 32 decreases and therefore, the magnetic attracting force generated between the resin particles 32 and the magnetic latent image 63 decreases. Accordingly, when the liquid ink 31 is transferred to the recording paper 7, some of the resin particles 32 are transferred to the recording paper 7 together. When the resin particles 32 have a diameter of not less than 50 cm, the amount of the magnetic powder 72 contained in the resin particles 32 is so large that the magnetic force of the resin particles 32 increases. At the same time, the weight of the resin particles increases and therefore, the effect of gravitation applying on the resin particles 32 cannot be neglected. Accordingly, it becomes difficult to hold the resin particles 32 on the magnetic drum 1 by the magnetic attracting force. At this time, if the content of the magnetic powder 72 is increased in order to increase the magnetic attracting force between the resin particles 32 and the magnetic latent image 63, the specific gravity of the resin particles 32 becomes larger than that of the liquid ink 31 and therefore, the resin particles 32 cannot keep being dispersed in the liquid ink 31. Moreover, the resolution of the image formed on the recording paper 7 is deteriorated. Because of the above-mentioned reasons, the diameter of the resin particles 32 is selected in the range of 5 $\mu$m to 50 $\mu$m. When the resin particles 32 are prepared by the above method, the diameter of the resin particles 32 and the amount of the magnetic powder 72 contained in the resin particles 32 will vary. In order to select a range of variation which does not cause any practical problem, the diameter of the resin particles 32 is preferably selected in the range of 10 $\mu$m to 40 $\mu$m.

As for the ferromagnetic pigment which is the magnetic powder 72 to be dispersed in the resin particles 32, those used as a raw material of the magnetic toner of the electrophotography, for example, magnetite may be used instead of an iron oxide pigment. As for the liquid ink 31, materials as follows may be used as a coloring pigment or a dye in the case where water is used as a solvent. As for a black ink, aniline black may be used instead of carbon black. As for other color inks, azo pigments, quinacridone pigments, cyanine pigments and the like can be used. These are all hydrophilic pigments.

Moreover, a resin made of ethylene cellulose may be dispersed in the liquid ink 31 in order to improve fixation of the liquid ink 31 after the liquid ink 31 is transferred to the recording paper 7.

Further, on the peripheral surface of the magnetic layer 61 of the magnetic drum 1, as a coating layer for protecting from corrosion caused by the wet developer 30, a solvent-soluble fluorine plastic layer may be formed.

As mentioned above, according to the present invention, the magnetic powder is dispersed in the ink by being contained in a particle of resin, so that the magnetic powder contacts with the ink through the resin. Therefore, the binding force between the magnetic powder and the ink is smaller in the case where the resin is intervening between them than in the case where a surface active agent is intervening between them. Accordingly, when transferring is conducted by using the developer containing the particles and the ink for the image formation apparatus, the ink and the particles can easily separate, so that clear image can be formed without a blur.

Further, according to the present invention, by selecting the ink so that the specific gravity of the ink is larger than that of the particles, dispersion of the particles in the ink can be improved. Accordingly, the developer with uniform magnetic material density can be obtained.

Further, according to the present invention, by selecting the ink so that the viscosity of the ink is in the range of 2 cp to 500 cp, the developer containing the ink and the particles in a constant ratio can be stably supplied in the case of using the developer containing the ink in the image formation apparatus. Moreover, by using the developer, the image having a sufficient density can be formed.

Further, according to the present invention, by selecting the particles so that the diameter of the particles is in the range of 5 $\mu$m to 50 $\mu$m, the magnetic latent image attracts the particles, so that only ink can be transferred to the recording member in the case of using the developer containing the particles in the image formation apparatus. Accordingly, the image having a good reproducibility of colors can be formed on the recording member.

Further, according to the present invention, the magnetic latent image, which has been formed by the magnetic latent image formation means on the magnetic latent image carrier cleaned by means of the demagnetizing means and the removing means, is supplied with the developer from the developer storage means for storing the developer by means of the developer supplying means, whereby the magnetic latent image is developed. When the developed image is supplied with the recording member by the transferring means, only the ink is transferred to the recording member with the particles being held on the magnetic latent image carrier. Accordingly, the image can be formed on the recording member with a good reproducibility of colors faithful to the original picture.

Further, according to the present invention, by providing the stirring means in the developer storage means in order to stir the developer, the developer containing the particles and the ink in a constant mixed ratio can be supplied to the developer supplying means. Accordingly, the image having a constant density gradation can be formed.

Further, according to the present invention, by providing the restricting means for restricting the amount of the developer to be supplied by the developer supplying means, supplying an excess amount of the ink can be avoided. Accordingly, even in the case of transferring the ink to the recording member by pressure, a clear image without a blur can be formed on the recording member. Moreover, since a suitable amount of the ink can be supplied, the ink transferred to the recording member dries fast and it is not necessary to provide the fixing means. Therefore, the apparatus having a simple structure can be actualized.

Further, according to the present invention, after transferring the developed image to the recording member, the magnetic latent image carrier is demagnetized by means of the demagnetizing means, and the developer on the magnetic latent image carrier is removed by the removing means. Accordingly, images can be formed repeatedly by using the magnetic latent image carrier.

What is claimed is:

1. A developer for developing a magnetic latent image, comprising:

a liquid ink and particles of a resin to be dispersed in the liquid ink, the particles containing a magnetic powder dispersed in the resin, wherein a specific gravity of the ink is larger than that of the particles, and the ink contains water as a solvent, each one of the particles containing 98% by weight of the resin and 2% by weight of the magnetic powder.

2. A magnetic image formation apparatus comprising:

a magnetic latent image carrier;

a magnetic latent image formation means for forming a magnetic latent image on the magnetic latent image carrier;

a developer storage means for storing a developer including a liquid ink and particles of resin to be dispersed in the liquid ink, each one of the particles of resin containing magnetic powder, the magnetic powder including a plurality of portions dispersed in each one of the particles of resin, with each portion of the magnetic powder being completely covered and separated from each other by resin of the particles of resin;

a developer supplying means for supplying the magnetic latent image carrier having the magnetic latent image formed thereon with the developer stored by the developer storage means so as to develop the magnetic latent image;

a transferring means for transferring the developed image to a predetermined recording member;

a demagnetizing means for demagnetizing the magnetic latent image carrier; and a removing means for removing the developer on the magnetic latent image carrier.

3. The magnetic image formation apparatus of claim 2, further comprising a stirring means for stirring the developer stored in the developer storage means.

4. The magnetic image formation apparatus of claim 2, further comprising a restricting means for restricting an amount of the developer to be supplied by the developer supplying means.

5. The magnetic image forming apparatus of claim 2, wherein a specific gravity of the ink is larger than that of the particles.

6. The magnetic image forming apparatus of claim 3, wherein the ink contains water as a solvent, the particle containing 98% by weight of the resin and 2% by weight of the magnetic powder.

7. The magnetic image forming apparatus of claim 2, wherein the ink is selected so that a viscosity of the ink is in the range of 2 cp to 500 cp.

8. The magnetic image forming apparatus of claim 2, wherein a diameter of the particles is selected depending on a strength of a magnetic force of the magnetic latent image.

9. The magnetic image forming apparatus of claim 2, wherein a diameter of the particles is in the range of 5 $\mu$m to 50 $\mu$m.

10. A magnetic image formation apparatus comprising:

a magnetic latent image carrier;

a magnetic latent image formation means for forming a magnetic latent image on the magnetic latent image carrier;

a developer storage means for storing a developer including a liquid ink and particles of resin to be dispersed in the liquid ink, each one of the particles of resin containing magnetic powder, the magnetic powder including a plurality of portions dispersed in each one of the particles of resin, each one of the portions of magnetic powder being completely surrounded by resin in the particle of resin in which it is located;

a developer supplying means for supplying the magnetic latent image carrier having the magnetic latent image formed thereon with the developer stored by the developer storage means so as to develop the magnetic latent image;

a transferring means for transferring the developed image to a predetermined recording member;

a demagnetizing means for demagnetizing the magnetic latent image carrier; and a removing means for removing the developer on the magnetic latent image carrier, wherein the demagnetizing means demagnetizes the magnetic latent image carrier after transferring the developed image to the predetermined recording member, and the removing means removes the developer on the magnetic latent image carrier after demagnetizing the magnetic latent image carrier.

11. A liquid developer for developing a magnetic latent image, comprising:

a liquid ink and particles of a resin having an affinity to the liquid ink, the particles containing a magnetic powder dispersed in the resin and having such a specific gravity value, so that the particles are uniformly dispersed in the liquid ink, said specific gravity value dependent on an amount of the magnetic powder in each of the particles.

12. A magnetic image formation apparatus comprising:

a magnetic latent image carrier;

a magnetic latent image formation means for forming a magnetic latent image on the magnetic latent image carrier;

a developer storage means for storing a liquid developer;

a developer supplying means for supplying the magnetic latent image carrier having the magnetic latent image formed thereon with the liquid developer stored by the developer storage means so as to develop the magnetic latent image;

a transferring means for transferring the developed image to predetermined recording member;

a demagnetizing means for demagnetizing the magnetic latent image carrier; and a removing means for removing the developer on the magnetic latent image carrier;

wherein the liquid developer includes a liquid ink and particles of a resin having an affinity to the liquid ink, the particles containing a magnetic powder dispersed in the resin and having a specific gravity value, so that the particles are uniformly dispersed in the ink, said specific gravity value dependent on an amount of the magnetic powder in each of the particles.

* * * * *